United States Patent [19]
Hecht

[11] Patent Number: 6,147,358
[45] Date of Patent: *Nov. 14, 2000

[54] CCD SCANNER HAVING IMPROVED SPECULAR REFLECTION DISCRIMINATION

[75] Inventor: Kurt Hecht, Hartsville, Pa.

[73] Assignee: Accu-Sort Systems, Inc., Telford, Pa.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/328,673

[22] Filed: Jun. 9, 1999

Related U.S. Application Data

[63] Continuation of application No. 08/790,956, Jan. 29, 1997, Pat. No. 5,942,762.

[51] Int. Cl.[7] ........................................ G06K 7/10
[52] U.S. Cl. ...................... 250/566; 250/559.44
[58] Field of Search ................... 250/566, 556, 250/235, 559.44, 216, 208.1; 235/462, 472, 462.42; 382/313

[56] References Cited

U.S. PATENT DOCUMENTS

| | | | |
|---|---|---|---|
| 3,808,447 | 4/1974 | Leavens, Jr. ............................ | 250/569 |
| 4,782,219 | 11/1988 | Crater .................................... | 250/566 |
| 5,010,241 | 4/1991 | Butterworth ....................... | 235/462.24 |
| 5,149,948 | 9/1992 | Chisholm ............................ | 235/462 |
| 5,239,169 | 8/1993 | Thomas ............................... | 235/462 |
| 5,406,060 | 4/1995 | Gitin .................................... | 235/462 |
| 5,442,438 | 8/1995 | Batchelder et al. ................ | 356/301 |
| 5,449,892 | 9/1995 | Yamada ............................... | 235/462 |
| 5,541,419 | 7/1996 | Arackellian ....................... | 250/566 |
| 5,717,221 | 2/1998 | Li et al. ............................. | 235/462.41 |
| 5,814,827 | 9/1998 | Katz ..................................... | 250/566 |
| 5,942,762 | 8/1999 | Hecht .................................. | 250/556 |

FOREIGN PATENT DOCUMENTS

| | | |
|---|---|---|
| 0378198A2 | 7/1990 | European Pat. Off. . |
| 0690404A2 | 1/1996 | European Pat. Off. . |
| 19510257A1 | 9/1995 | Germany . |
| 2102610A | 2/1983 | United Kingdom . |

OTHER PUBLICATIONS

Patent Abstracts of Japan, vol. 011, No. 032 (P–541), Jan. 30, 1987, and JP 61 201381 A (Ricoh Co. Ltd.), Sep. 6, 1986, see abstract.

*Primary Examiner*—Que T. Le
*Attorney, Agent, or Firm*—Volpe and Koenig, P.C.

[57] ABSTRACT

An optical scanner utilizes two linear CCD detectors and a bandpass means to improve the ability of the scanner to discriminate against specular reflection. A coded symbology is illuminated by a noncoherent light source and light reflected from the coded symbology along a first path strikes the front face of the bandpass means. The bandpass means, functioning as a notch filter, transmits a select bandwidth of light while reflecting all other light onto a first CCD detector. Simultaneously, light reflected from the bar code symbol travels along a second path, at a different angle with respect to the plane of the coded symbology than the first path, is reflected from a mirror onto the back face of the bandpass means. The bandpass means transmits the select bandwidth of light onto a second CCD detector and reflects all other light. The second CCD detector has a notch filter which permits the detection of only the select bandwidth. Since specular reflection is only experienced at a single angle, with respect to the plane of the coded symbology and each CCD detector detects an image at a different angle with respect to the plane of the coded symbology, a complete image can be reconstructed by combining information obtained from both CCD detectors.

16 Claims, 6 Drawing Sheets

CCD SCANNER HAVING IMPROVED SPECULAR REFLECTION DISCRIMINATION

This application is a continuation of U.S. patent application Ser. No. 08/790,956 Jan. 29, 1997, now U.S. Pat. No. 5,942,762.

BACKGROUND OF THE INVENTION

1. Field of the Invention

The present invention relates generally to optical scanning systems. More particularly, this invention relates to a system and method capable of detecting coded symbologies in the presence of specular reflection.

2. Description of Related Art

Coded symbologies are being used in an increasingly diverse array of applications. The ability to track a large amount of items quickly and efficiently has led coded symbologies to be used in applications such as retail checkout, warehousing, inventory control and document tracking. As the volume of items tracked by coded symbologies has increased, the need for optical scanners which operate at high speeds has likewise increased.

Various optical scanning systems have been developed for reading and decoding coded symbologies. Scanning systems include optical laser scanners and optical charge-coupled device (CCD) scanners. Optical laser scanners generally employ a laser diode, a multifaceted polygonal mirror, focusing optics and a detector. The scanning rate of an optical laser scanner is limited by the number of facets on the mirror and the available motor speed.

CCD scanners may incorporate a non-laser light source and a CCD light detecting means, such as a CCD linear sensor. A portion of the light which is reflected from the coded symbology is detected by the CCD linear sensor and converted into an electrical signal which is the basis for a digital image of the coded symbology that has been scanned. The digital image is then processed and decoded according to the specific type of coded symbology.

One disadvantage with current CCD scanners is that they are susceptible to specular reflection which saturates areas of the CCD linear sensor and prohibits the detection of a portion of the optically coded information. This is particularly a problem when the coded symbology is printed under a highly reflective surface, such as a plastic coating.

Specular reflection is only a problem at a single angle, known as the "critical angle", between the light source, the reflective surface and the CCD linear sensor. Current methods of coping with specular reflection include placing separate scanners at different angles with respect to the surface. However, providing duplicate CCD scanners for this purpose is extremely expensive. Techniques involving light polarizers have also been used. However, due to the light losses introduced by the materials used to make light polarizers, they are extremely inefficient.

Accordingly, there exists a need for an efficient and inexpensive scanning system with the speed of a CCD scanner that can accurately read and decode coded symbologies in the presence of specular reflection.

SUMMARY OF THE INVENTION

The present invention utilizes two CCD linear sensors and a bandpass means to improve the ability of an optical scanner to discriminate against specular reflection. A coded symbology is illuminated by a noncoherent light source and light reflected from the coded symbology travels along a first path and strikes the front face of the bandpass means. The bandpass means, functioning as a notch filter, transmits a select bandwidth of light while reflecting all other light onto a first CCD linear sensor. Simultaneously, light reflected from the bar code symbol travels along a second path, at a different angle with respect to the plane of the coded symbology than the first path, and is reflected from a mirror onto the back face of the bandpass means. The bandpass means transmits the select bandwidth of light onto a second CCD linear sensor and reflects all other light. The CCD linear sensors each have a notch filter which permits the detection of only a select bandwidth. Since specular reflection is only experienced at a single angle with respect to the plane of the coded symbology, and each CCD linear sensor detects an image at a different angle with respect to the plane of the coded symbology; a complete image of the coded symbology is obtained by one or both of the CCD linear sensors, or can be reconstructed by combining information obtained from both CCD linear sensors.

Accordingly, it is an object of the invention to provide a CCD scanner which can read and decode coded symbologies in the presence of specular reflection.

Other objects and advantages will become apparent to those skilled in the art after reading the detailed description of a presently preferred embodiment.

DETAILED DESCRIPTION OF THE PREFERRED EMBODIMENT

Figure 1:
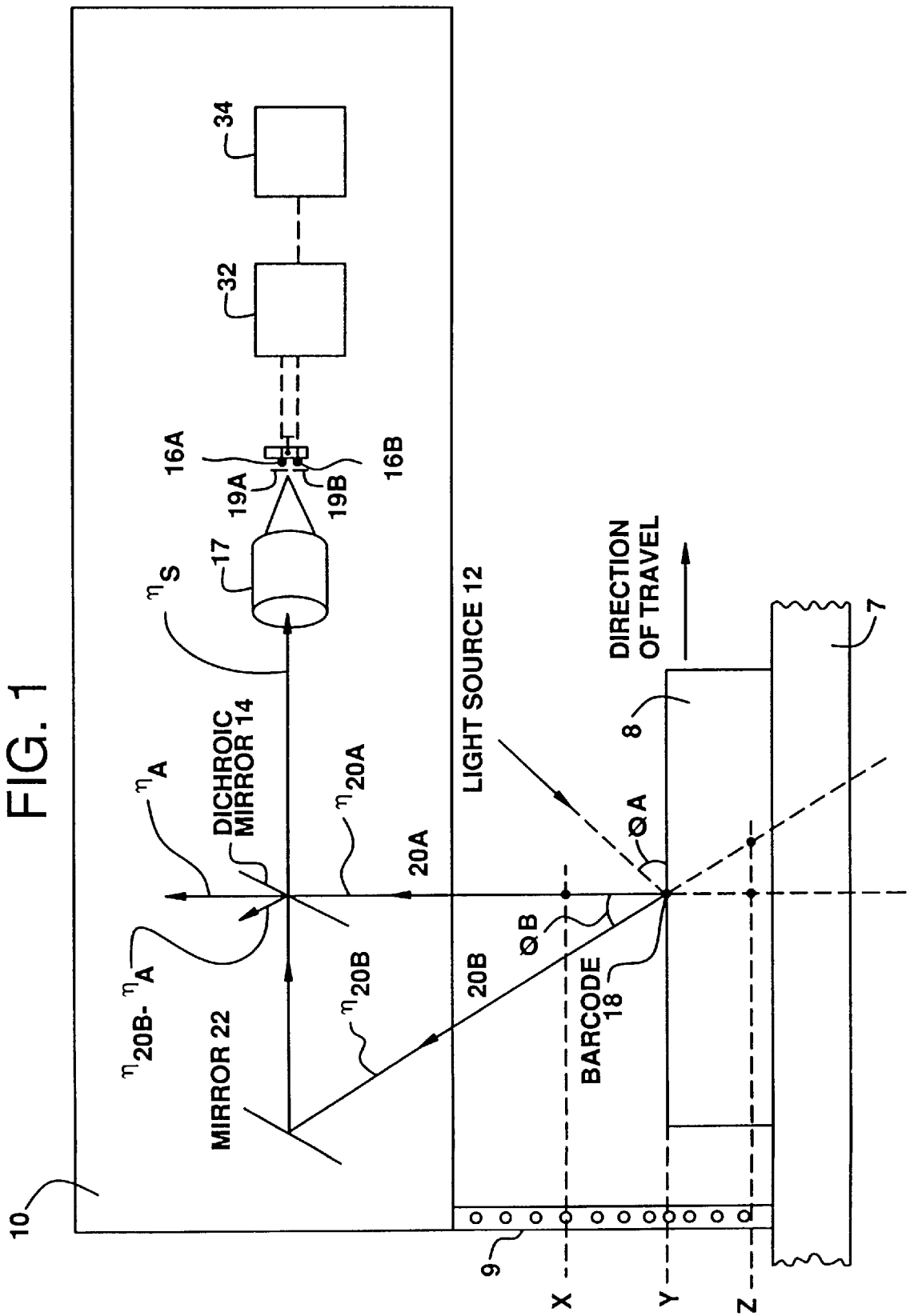
FIG. 1 is a coded symbology scanning system made in accordance with the present invention.

The preferred embodiment will be described with reference to the drawing figures wherein like numerals represent like elements throughout. Referring to FIG. 1, a coded symbology scanning system 10 made in accordance with the present invention is shown. The coded symbology scanning system 10 is able to scan any type of coded symbology. However, for simplicity, reference hereinafter will be made to a particular type of coded symbology, i.e. a bar code symbol. The scanning system 10 includes a non-coherent light source 12, a bandpass means 14, a planar mirror 22, focusing optics 17, two CCD linear sensors 16A and 16B, two filters 19A and 19B, a logic unit 32 and an output means 34.

The light source 12 facilitates detection of a subject bar code symbol 18 by illuminating the bar code symbol 18 located on a package 8 or other object. Preferably, the package 8 is supported by a moving conveyor belt 7. The planar mirror 22 and the bandpass means 14 are aligned such that light reflected from the bar code symbol 18 along a first path 20A strikes the front of the bandpass means 14, while light traveling along a second path 20B reflects off the planar mirror 22 and strikes the rear of the bandpass means art 14.

It should be recognized by those skilled in the art that FIG. 1 is illustrative only and is not drawn to scale. For example, the angle $\theta_A$ between the light source 12 and the bar code symbol 18 is typically 77°. The angle $\theta_B$ between the first path 20A and the second path 20B is approximately 3–5°. However, it should be recognized by those skilled in the art that these angles are approximate and may vary widely depending upon the specific application and the mounting of the system 10 in relation to the bar code 18.

The bandpass means 14 permits light of predetermined wavelengths around $\eta_A$, striking either its front or rear surface, to pass through the bandpass means 14, and reflects the remainder of the light spectrum. The spectrum of light $\eta_{20A}$ traveling along the first path 20A strikes the front of the bandpass means 14. Light having wavelengths around $\eta_A$ passes through the bandpass means 14, while the remainder of the spectrum of light $\eta_{20A}-\eta_A\pm$ is reflected toward the CCD detectors 16A, 16B. The spectrum of light $\eta_{20B}$ traveling along the second path 20B is reflected off the planar mirror 22 and strikes the back of the bandpass means 14. Light having wavelengths around $\eta_A$ passes through the bandpass means 14 toward the CCD detectors 16A, 16B, while the remainder of the light spectrum $\eta_{20B}-\eta_A\pm$ is reflected off the back of the bandpass means 14.

It should be appreciated that the bandpass means 14 may function as a filter wherein the bandpass means 14 transmits a small bandwidth of light while reflecting the remainder of the light spectrum. Alternatively, the bandpass means 14 may function as a mirror, wherein the bandpass means 14 reflects a small bandwidth of light while transmitting the remainder of the light spectrum. Preferably a mirrored dichroic filter is used.

The composite spectrum $\eta_S$ of light which reaches the focusing optics 17 comprises predetermined wavelengths around $\eta_A$ from the second path 20B and the remainder of the spectrum $\eta_{20A}-\eta_A\pm$ from the first path 20A. The composite spectrum $\eta_S$ passes through the focusing optics 17, through the filters 19A, 19B and onto the CCD linear array detectors 16A, 16B. Both filters 19A, 19B permit the respective detector 16A, 16B to detect non-overlapping bands of light.

Figure 2A:
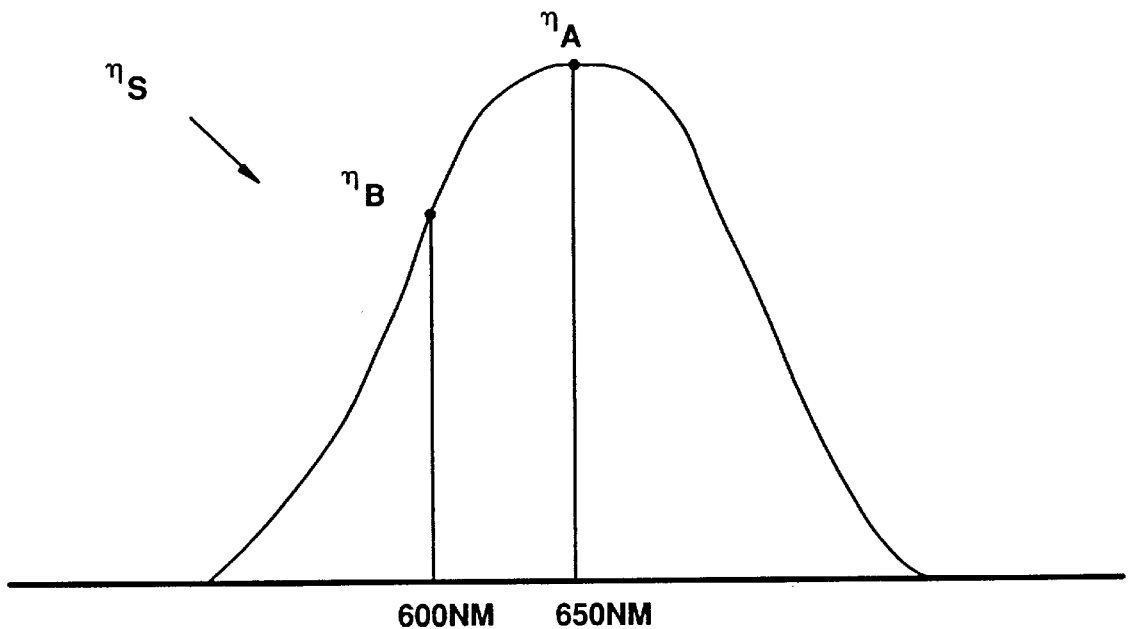
FIG. 2A is a diagram showing the spectrum of light.

Referring to FIG. 2, the second CCD detector 16B is filtered to detect light having wavelengths around $\eta_A$. The first CCD detector 16A is filtered to permit the detection of light around a different wavelength $\eta_B$. For example, the bandpass means 14 may be calibrated to transmit light around wavelength $\eta_A$ of 650 NM±. The second CCD detector 16B is filtered to detect light around the wavelength $\eta_A$ of 650 NM± originating from the second path 20B. The first CCD detector 16B is filtered to detect light around wavelength $\eta_B$ which originates from first path 20A, for example 600 NM±. Accordingly, the detectors 16A, 16B will detect two separate images of the bar code symbol 18.

Although the detectors 16A, 16B have been referred to as separate CCD linear sensors, preferably they comprise two of the three channels commonly found in a color CCD line scan sensor. In this embodiment, the color filters are preferably replaced with the appropriate notch filters 19A, 19B. Those of skill in the art should realize that the bandwidth transmitted by each notch filter 19A, 19B, including tolerances, should not overlap with the other notch filter 19A, 19B. Additionally, the notch filters 19A, 19B need not be of equal bandwidth. One notch filter 19A may have a narrow bandwidth of 590–610 NM±, and the other notch filter 19B may have a wide bandwidth of 625–675 NM±. Additionally, although two notch filters 19A, 19B may be employed, it is also possible to use one notch filter 19A, wherein the other filter 19B transmits all other wavelengths of light except for the bandwidth transmitted by the notch filter 19A. In all of these examples, the tolerances of the filters 19A, 19B should be kept in mind to avoid any overlap.

It should be apparent to those skilled in the art that the bandpass means 14 and the filters 19A, 19B over the CCD detectors 16A, 16B may be calibrated to detect any wavelength of light that is suitable for the desired application. The above values are illustrative only and should not be viewed as a limitation of the invention.

The light detected by the second CCD detector 16B comprises light from the second path 20B having wavelengths around $\eta_A$. The light detected by the first CCD detector 16A comprises light from the first path 20A having wavelengths around $\eta_B$. By definition, specular reflections only occur at a "critical angle". Once specular reflection occurs, this angle is defined and will be present only in one of the optical paths. Therefore, the other path will have useful information. If specular reflection "washes out" the view of the bar code symbol 18 at any point along the first path 20A, specular reflection will not be present in the second path 20B at the same point since the angle of the bar code symbol 18 with respect to the second path 20B is different than the angle with respect to the first path 20A.

Figure 2B:
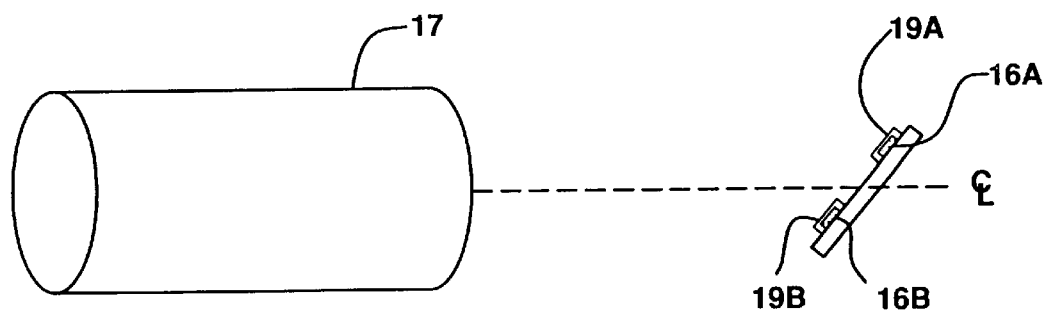
FIG. 2B is a more detailed diagram of the CCD detectors.

Referring to FIG. 2B, since the lengths of the two paths 20A, 20B are different, the detectors 16A, 16B must be selectively placed to account for this difference. In FIG. 1, path 20A is shorter than path 20B. Preferably, the detectors 16A, 16B are mounted upon a common substrate which is rotated upon a center line CL to position the first detector 16A further from the focusing optics 17 than the second detector 16B.

Figure 3:
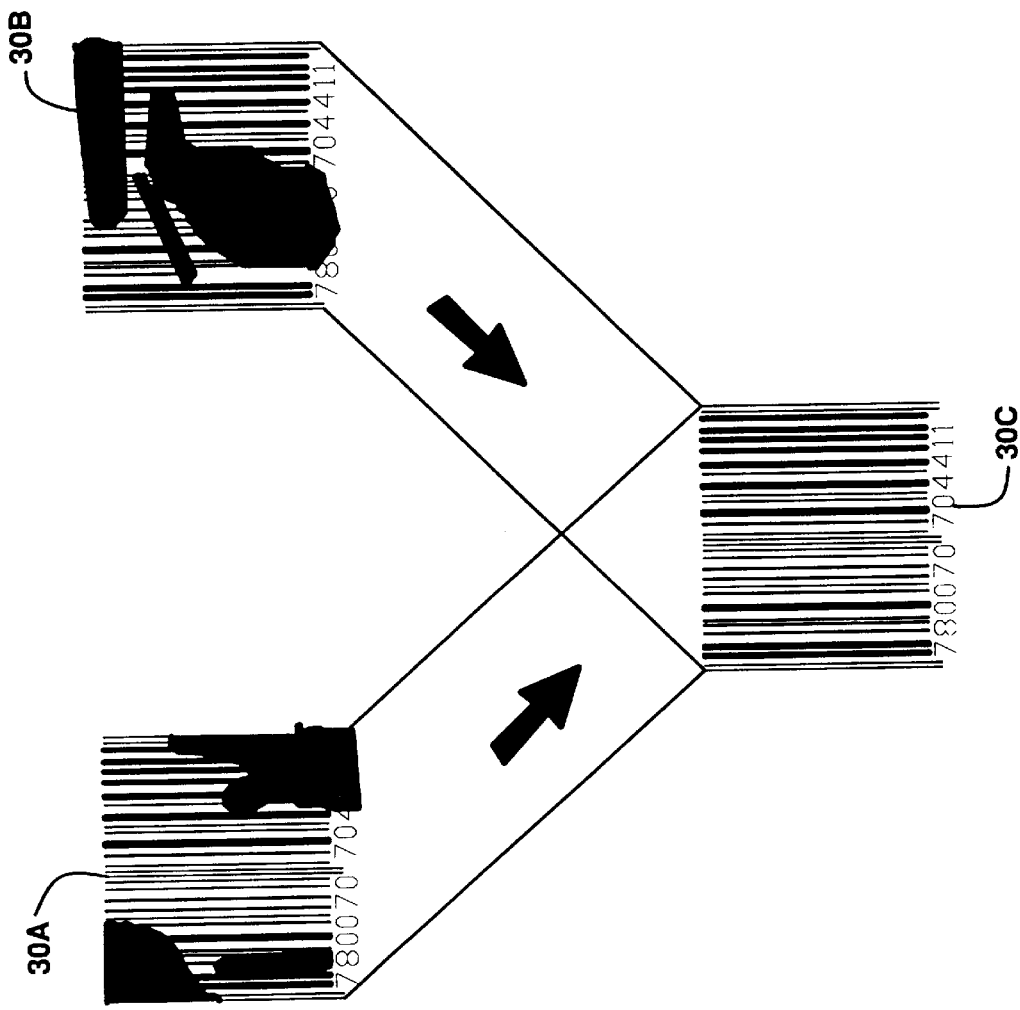
FIG. 3 illustrates the method of using valid information from two views and selectively combining the information.

Each of the CCD detectors 16A, 16B produces an electrical signal which corresponds to the detected light. Using the images 30A, 30B, 30C in FIG. 3 as a visual example of the reconstruction process, comparison of images 30A and 30B shows that image 30A has portions of specular reflection distortion, while image 30B also has portions of specular reflection distortion. However, the non-distorted areas of the images 30A, 30B can be used to form the complete image 30C. Although the images 30A, 30B, 30C are illustrated as area images, the preferred embodiment of the present invention detects and combines multiple line scans which make up the area images. It is clearly within the scope of the present invention to utilize detectors which detect either line or area scans.

Processing of the data from CCD detectors 16A, 16B to construct a complete bar code symbol 18 will be explained with reference to FIG. 4. The data from the CCD detectors 16A, 16B is output and analyzed by the logic unit 32. Depending upon the amount of specular reflection, data from one or both of the CCD detectors 16A, 16B may comprise a complete image of the bar code symbol 18. In that case, the complete image is used for further decoding in accordance with the specific type of symbology. If specular reflection is detected by the logic unit 32 in the data output from the first CCD detector 16A the logic unit 32 replaces the data with the data from the second CCD detector 16B.

Figure 4:
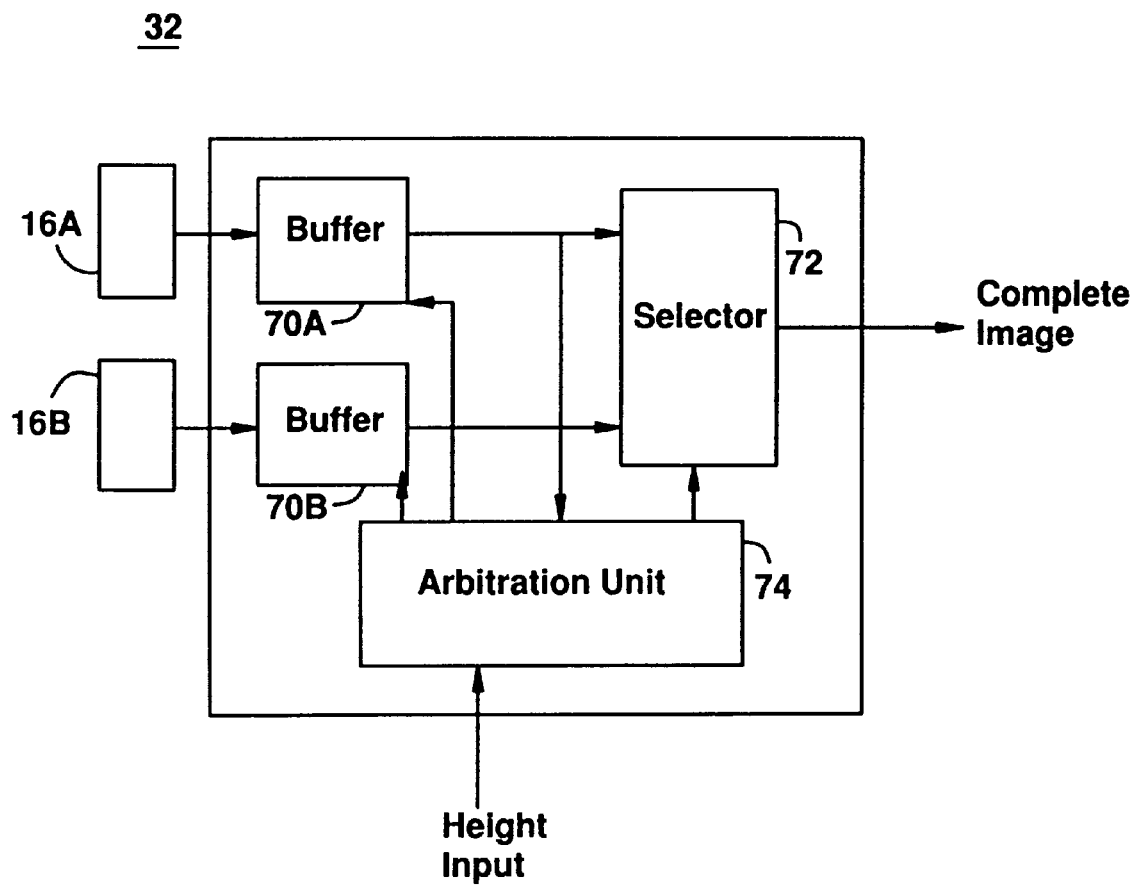
FIG. 4 is a block diagram of the coded symbology logic unit.
Figure 5:
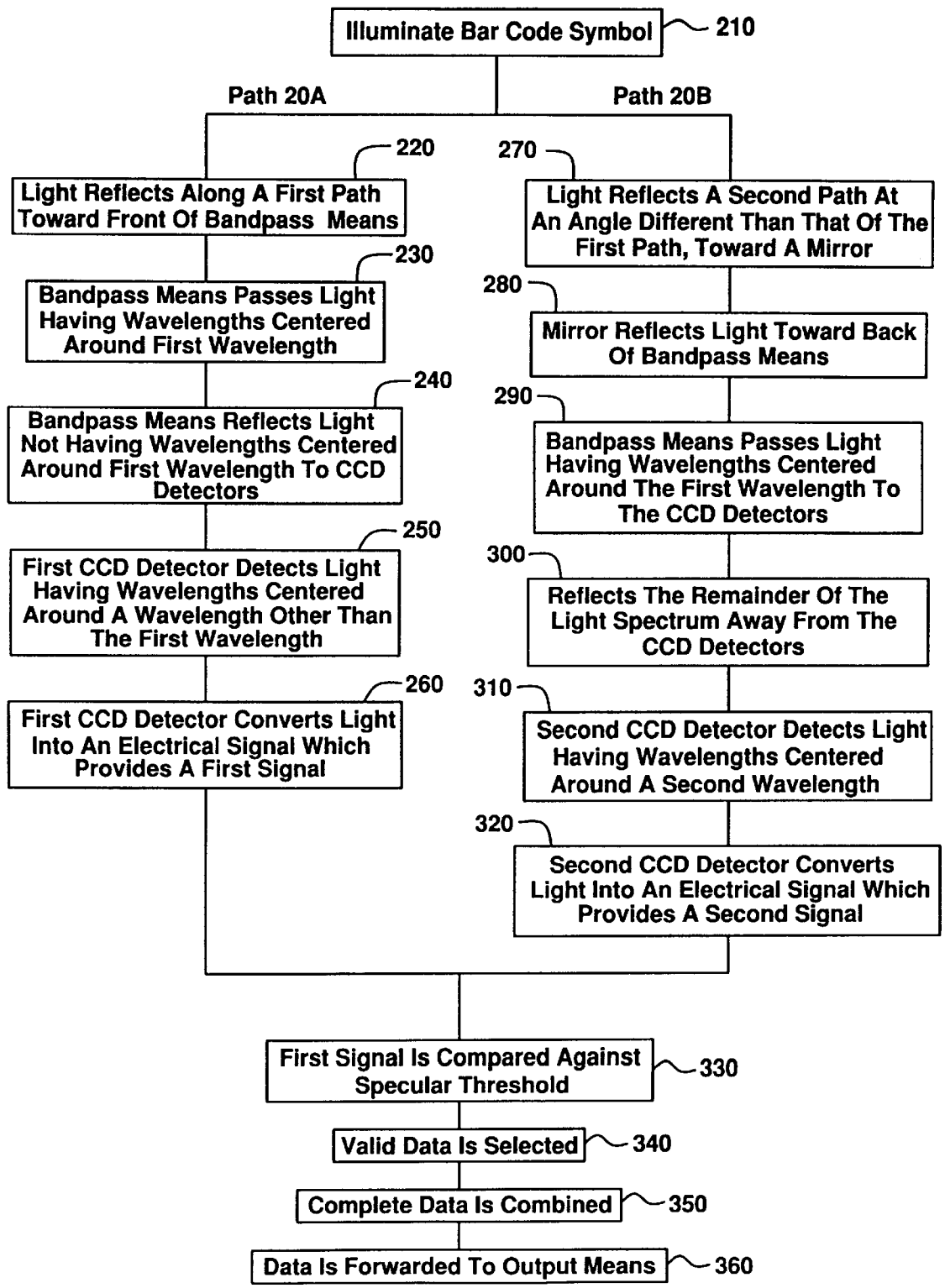
FIG. 5 is a flow diagram of the method of the present invention.

Referring to FIG. 4, the logic unit 32 comprises two buffers 70A, 70B, a selector 72 and an arbitration unit 74. The logic unit 32 receives the data, containing bar code information, from the CCD detectors 16A, 16B. The information coming from the CCD detectors 16A, 16B is selectively buffered depending upon the height of the package 8 upon which the bar code 18 is affixed. Referring back to FIG. 1, at a first height Y, the information is obtained simultaneously from both light paths 20A, 20B. Accordingly, no buffering of the data is required. However, when the package 8 to which the bar code 18 is affixed reaches height X, the second light path 20B will obtain the bar code information prior to the first light path 20A. Therefore, information from the second light path 20B must be buffered by the buffer 70B prior to comparison with the information from the first light path 20A. Conversely, if the height of the package 8 to which the bar code 18 is affixed only reaches height Z, the first light path 20A will detect the information prior to the second light path 20B. In this event, the information from the first light path 20A will be buffered by buffer 70A. Each buffer 70A, 70B delays the information obtained from the respective light path 20A, 20B to synchronize the information with that obtained from the other light path 20B, 20A.

As discussed above, the delay is dependent upon the distance between the system 10 and the bar code symbol 18. The distance between the system 10 and a package 8 having the bar code symbol 18 located thereon may be obtained by using a light curtain 9, as in FIG. 1, or by any other means which is well known by those skilled in the art. From the height, or distance, the delay value may be calculated, or a look up table may be used. The delay value is then input into the desired buffer 70A, 70B.

After the signal output from either detector 16A, 16B has been buffered as necessary, the signals are compared by the arbitration unit 74. The signals comprise values which represent the intensity of light detected by the pixels of the CCD detectors 16A, 16B. If the CCD detectors 16A, 16B have eight-bit resolution, the number of gray scale levels will be 255 ($2^8-1$). Depending upon the application, it may be assumed that a valid signal will have a gray scale value between 0 and 240. If the gray scale value exceeds a predetermined threshold of 240, specular reflection is present. This threshold may be adjusted depending upon the particular application. In the preferred embodiment the arbitration unit 74 controls the selector 72 to select the output from the second CCD detector 16B when the value from the output from the first CCD detector 16A exceeds 240. In this manner, a complete image of the bar code symbol 18 is obtained.

The logic unit 32 forwards a complete digital image, corresponding to the information encoded in the bar code symbol 18, to an image processor 34 for decoding, storage or display, as is well known by those skilled in the art.

The scanning system 10 shown in FIG. 1 may be embodied in a mobile hand-held unit, or may be a stationary unit wherein an object carrying the bar code symbol 18 is passed under the light source 12 via a conveyor 7.

In operation, the scanning system 10 executes the bar code symbol reading and decoding procedure 200 shown in FIG. 4. The light source 12 illuminates a subject bar code symbol 18 (step 210). Light is reflected from the bar code symbol 18 along a first path 20A toward the front of the bandpass means 14 (step 220). The bandpass means 14 transmits light around a first predetermined wavelength (step 230) and reflects the remainder of the light spectrum toward the CCD detectors 16A, 16B (step 240). The first CCD detector 16A detects light around a second predetermined wavelength from the first light path 20A. (step 250).

Simultaneously, light is reflected from the bar code symbol 18 along a second path 20B (step 270) toward the back of the bandpass means 14 (step 280). The bandpass means 14 passes light around the first predetermined wavelength to the CCD detectors 16A, 16B (step 290) and reflects the remainder of the light spectrum away from the CCD detectors 16A, 16B (step 300). Light originating from the second path 20B comprises only light around the first predetermined wavelength. Accordingly, it will be detected by the second CCD detector 16B (step 310).

The CCD detectors 16A, 16B convert the detected light into electrical signals which are output to the logic unit 32 (steps 260, 320). The logic unit 32 compares the signals (step 330) and the valid data is selected (step 340). This data is used to provide a complete bar code symbol 18. In the event that both signals comprise non-distorted data, the non-distorted data of either signal may be used. The logic unit 32 then arbitrates the data representing the complete bar code symbol 18 (step 350) and forwards the data to the output means 34 (step 350).

Figure 6:
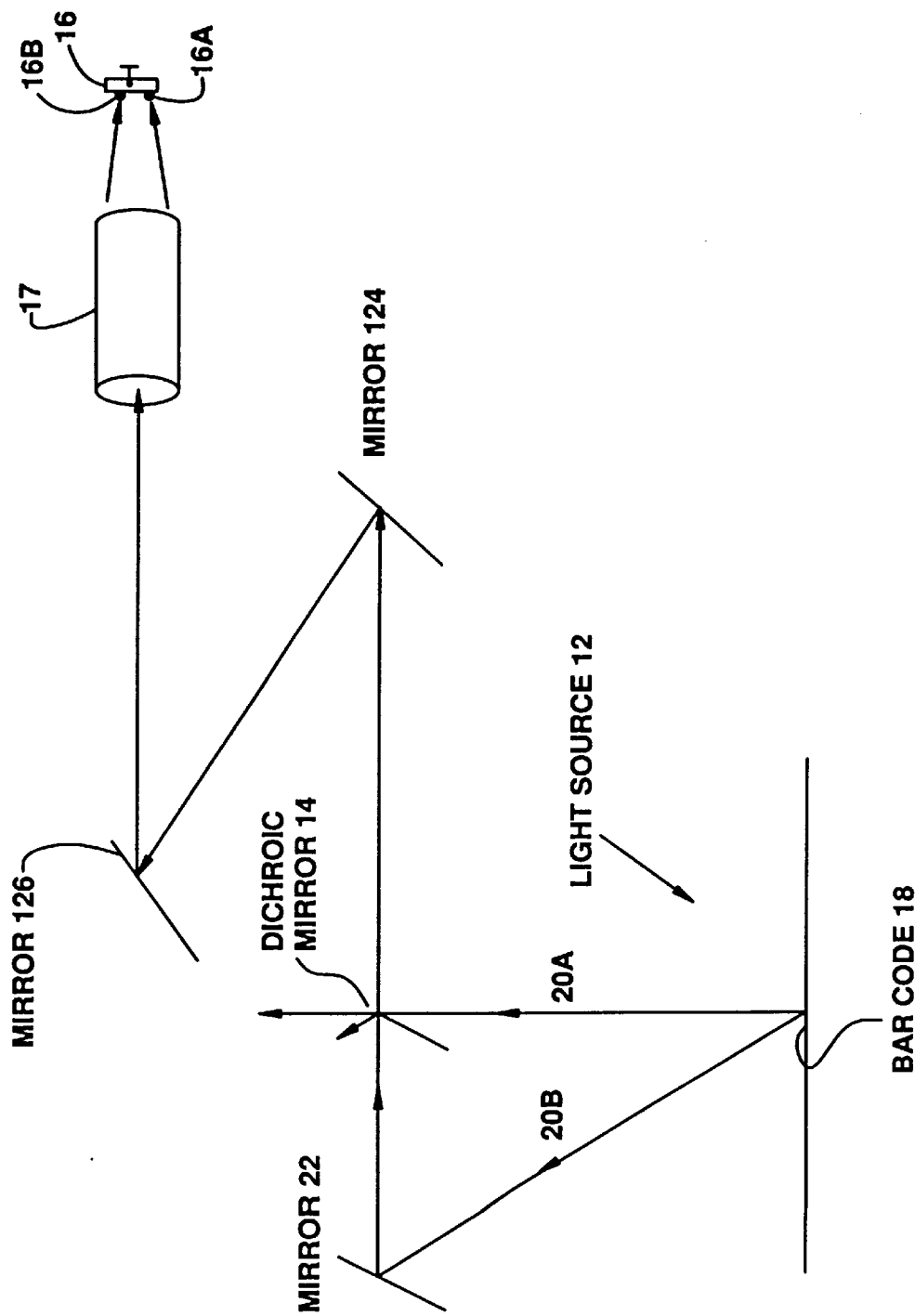
FIG. 6 is an alternative embodiment of the present invention.

Referring to FIG. 6, an alternative embodiment of the scanning system 110 is shown in which additional mirrors 124 and 126 are added to the system 110 to direct the paths of light along a modified route. The modified route permits alignment of the components in cases where manufacturing or other considerations require that the components be placed in a configuration other than that shown in FIG. 1. It should be understood that various additional components and configurations can be employed to alter the light paths and the intensity and precision of the light without departing from the spirit and scope of the invention.

Although the invention has been described in part by making detailed reference to the preferred embodiment, such detail is intended to be instructive rather than restrictive. It will be appreciated by those skilled in the art that many variations may be made in the structure and mode of operation without departing from the teachings herein.

What is claimed is:

1. A scanner of a type that utilizes reflected illumination from the surface of an object for scanning a symbology, the scanner comprising:

a detector that collects illumination reflected from the symbology at different angles of reflection and outputs a detector signal wherein the light collected from each angle of reflection has different spectral content from light collected at other angles; and a logic unit that receives the detector output signal, evaluates the relative intensities of the reflected illumination and discriminates between the reflected illumination based on the evaluation of relative intensities.

2. The scanner of claim wherein the detector includes multiple light sensors.

3. The scanner of claim 1, wherein the light detected at the first angle travels along a first path defined by a bandpass means; and light detected at the second angle travels along a second path defined by a mirror, with the first and second paths converging prior to being incident upon the detector.

4. The scanner of claim 2 wherein the detector is angled with respect to light incident thereupon.

5. The scanner of claim 4 wherein the detector is orthogonal to light incident thereupon.

6. The scanner of claim 3 wherein the bandpass means is a filter.

7. The scanner of claim 6, wherein the detector further comprises a second bandpass means positioned to receive light from the bandpass means.

8. The scanner of claim 7 wherein a first light sensor is positioned adjacent a front surface of the second bandpass means and a second light sensor is positioned adjacent a back surface of the second bandpass means.

9. The scanner of claim 6, wherein the bandpass means is a mirrored dichroic filter.

10. The scanner of claim 6, wherein the bandpass means is a notch filter.

11. The scanner of claim 10, wherein the detector includes multiple light sensors.

12. The scanner of claim 11 wherein the bandpass means passes only a predetermined band of wavelengths from the light of the first angle to a first sensor and reflects all other wavelengths.

13. The scanner of claim 12 wherein the bandpass means passes the predetermined band of wavelengths from the light of the second angle and reflects all other wavelengths toward a second sensor.

14. The scanner of claim 13 wherein said first light sensor includes a first notch filter and said second light sensor includes a second notch filter; wherein said first notch filter transmits a first predetermined bandwidth of light and said second notch filter transmits a second predetermined bandwidth of light.

15. The scanner of claim 14 wherein the first notch filter transmits light from the first path and the second notch filter transmits light from the second path.

16. The scanner of claim 15 wherein both the first and second sensors generate an electrical signal corresponding to the intensity of light incident thereupon.

\* \* \* \* \*

UNITED STATES PATENT AND TRADEMARK OFFICE
CERTIFICATE OF CORRECTION

PATENT NO : 6,147,358
DATED : November 14, 2000
INVENTOR(S) : Kurt Hecht

It is certified that error appears in the above-identified patent and that said Letters Patent are hereby corrected as shown below:

At column 2, line 67, after the word "means" delete "art".

Signed and Sealed this

Twenty-ninth Day of May, 2001

Attest:

NICHOLAS P. GODICI

Attesting Officer      Acting Director of the United States Patent and Trademark Office